United States Patent
Qin et al.

(10) Patent No.: US 10,062,279 B2
(45) Date of Patent: Aug. 28, 2018

(54) TRAFFIC ALERT METHODS IN AN INTERSECTION AND VEHICLE MULTI-FUNCTIONAL AMBIENT LIGHT SYSTEMS

(71) Applicant: Ford Global Technologies, LLC, Dearborn, MI (US)

(72) Inventors: Kylin Qin, Nanjing (CN); Alice Sun, Nanjing (CN); Mark Xue, Nanjing (CN); Kelly Zhong, Nanjing (CN); Cary Jia, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/673,956

(22) Filed: Aug. 10, 2017

(65) Prior Publication Data

US 2018/0053414 A1    Feb. 22, 2018

(30) Foreign Application Priority Data

Aug. 22, 2016   (CN) .......................... 2016 1 0700720

(51) Int. Cl.
 G08G 1/095      (2006.01)
 G08G 1/0967     (2006.01)
 G08G 1/01       (2006.01)

(52) U.S. Cl.
 CPC ..... *G08G 1/096716* (2013.01); *G08G 1/0112* (2013.01); *G08G 1/0116* (2013.01); *G08G 1/096783* (2013.01); *G08G 1/095* (2013.01)

(58) Field of Classification Search
 None
 See application file for complete search history.

(56) References Cited

U.S. PATENT DOCUMENTS

| 3,775,743 | A | 11/1973 | Carter |
| 6,935,763 | B2 | 8/2005 | Mueller et al. |
| 6,985,073 | B1 | 1/2006 | Doan |
| 8,482,430 | B2 | 7/2013 | Szczerba |
| 2010/0253594 | A1* | 10/2010 | Szczerba ............... G01S 13/723 345/7 |
| 2014/0097748 | A1* | 4/2014 | Kato ..................... B60Q 9/008 315/77 |
| 2015/0217689 | A1 | 8/2015 | Frik et al. |

FOREIGN PATENT DOCUMENTS

DE        102014017337 A1    6/2015

OTHER PUBLICATIONS

"Creating Moods With Ambient Lighting in the Automobile Industry", Published Oct. 2, 2014.

* cited by examiner

*Primary Examiner* — Thomas McCormack
(74) *Attorney, Agent, or Firm* — Vichit Chea; Mohr IP Law Solutions, PC (57) ABSTRACT

A method to alert traffic light at an intersection in a vehicle is provided. The method comprises determining a driver intent related to a vehicle driving direction; determining a traffic light status corresponding to the driver intent; determining an alert position in the vehicle based on the driver intent; and illuminating the alert position with at least a first designated color based on the traffic light status.

11 Claims, 6 Drawing Sheets

TRAFFIC ALERT METHODS IN AN INTERSECTION AND VEHICLE MULTI-FUNCTIONAL AMBIENT LIGHT SYSTEMS

RELATED APPLICATION

This application claims the benefit of Chinese Patent Application No.: CN 201610700720.8 filed Aug. 22, 2016, the entire contents thereof being incorporated herein by reference.

FIELD

This invention relates to a multi-functional ambient light system in a vehicle to alert traffic in an intersection and a method to alert traffic light at an intersection.

BACKGROUND

A driver may receive various information while driving, such as speed limits, traffic light signals, and a distance from the surrounding obstacles. The U.S. Pat. No. 8,482,430 B2 discloses an apparatus for communicating information to a drive by illuminating an interior of a vehicle with different colors according to input information. However, the apparatus selects a position to illuminate in the interior based on information defined by the driver or a passenger, and a driver's intent and the road conditions are not considered when issue an alert via the illumination. The inventors have recognized that it is desirable to have a method and a system to activate the illumination module automatically to provide necessary and easily identified information to the driver based on one of the detected driver intent, driving conditions and the road conditions.

DESCRIPTION

According to one aspect of the invention, a method to alert traffic light at an intersection is provided. The method comprises determining a driver's intent relative to a vehicle traveling direction; determining a traffic light status corresponding to the driver intent; determining an alert position in the vehicle based on the driver intent; and illuminating the alert position with at least one designed color based on the traffic lights status.

In one embodiment, the driver intent may be determined based on a status of a turn signal light, a position of a turn signal switch, or a signal from a steering wheel sensor.

In another embodiment, the driver intent may be determined based on a lane of the vehicle at which the vehicle is traveling.

In another embodiment, the lane of the vehicle may be determined by an in-vehicle positioning device.

In another embodiment, the lane of the vehicle may be determined via a lane signed identified on an image captured by an in-vehicle camera system.

In another embodiment, the traffic light status may be determined by an in-vehicle camera system.

In another embodiment, the method determines that the alert position is at a left area of an instrument panel in response to the driver intent indicating a left turn; determines that the alert position is at a right area of the instrument panel in response to the driver intent indicating a right turn; and determines that the alert position is at an entire area of an instrument panel area or an entire area of a center console in response to the driver intent indicating going straight.

In another embodiment, the method determines that the alert position is at a left area of an instrument panel or a left area of a center console in response to the driver intent indicating traveling straight or a left turn.

In other an embodiment, illumination on the alert position ends after a predetermined time.

In an embodiment, the method further comprises that illuminating the alert position with at least a second designated color in response to a change of the traffic light from a first status to the second status.

According to another aspect, a multi-function ambient light system in a vehicle is provided. The multifunction ambient light system comprises an ambient light to illuminate a plurality color light at a plurality of positions and a control device to control the ambient light. The control device includes a driving information module configured to determine a driver intent related to a vehicle travelling direction; a traffic light module configured to determine a traffic light status corresponding to the driver intent received from the driving information module; and an ambient light control module configured to determine a preset position of illumination and control the ambient light to illuminate a designated color light based on the traffic status.

In one embodiment, the traffic light module may be communicated with an in-vehicle camera system to obtain information on the traffic light status.

In another embodiment, the driving information module may be communicated with an in-vehicle camera system to determine information on a lane of the vehicle.

In another embodiment, the driving information module may be communicated with a turn signal systems to determine the driver intent.

In another embodiment, the driving information system may be further configured to determine a vehicle driving speed, the traffic light module may be further configured to communicate with an in-vehicle positioning system to determine a speed limit, and the ambient light control module may be configured to control the ambient light to illuminate lights of different colors to indicate whether the vehicle speed is greater than, less than or equal to the speed limit.

In another embodiment, the driving information module may be further configured to determine a vehicle driving speed, the traffic light module may be configured to communicate with a distance detecting device to determine a distance with a front vehicle, a rear vehicle, a left vehicle and a right vehicle, and the ambient light control module may be configured to illuminate at a front portion, a rear portion, a left portion and a right portion of a steering wheel to indicate whether the distance with the front vehicle, the rear vehicle, the left vehicle and the right vehicle is in a safe range.

According to another aspect, a method to operate a multi-functional ambient light in a vehicle is provided. The method comprises determining a driving status of the vehicle; determining a road condition corresponding to the vehicle driving status; and controlling the multifunction ambient light to illuminating with a designated color at an alert position to provide information to a driver based on the driving status and road condition.

In one embodiment, the vehicle driving status may include a driver intent to change a lane, the road condition is a traffic light status and the alert position corresponding to a position indicating a permitted lane change.

In another embodiment, the vehicle driving status includes a vehicle speed or a speed change, and the road condition includes a speed limit. A step of controlling the multi-functional ambient light may include illuminating lights of different colors to indicate whether the vehicle driving speed conforms the speed limit.

In another embodiment, the vehicle driving status may include one of a distance between the vehicle and surrounding vehicles and a change in the driving direction, and the road condition may include a distance of the vehicle to a front vehicle, a rear vehicle, a left vehicle and a right vehicle. The step of controlling the ambient light may include illuminating light at a front portion, a rear portion, a left portion or a right portion of a steering wheel to indicate whether the distance of the vehicle with the front vehicle, the rear vehicle, the left vehicle and the right vehicle is in a safe range. The distance of the vehicle to the front vehicle, the rear vehicle, the left vehicle and the right vehicle may be determined by an object detecting device or a radar.

The vehicle traffic alert method and the multifunction ambient light system of the present disclosure alert the driver to take appropriate actions by illuminating colored lights at the different positions in the vehicle according to the vehicle traveling status and road condition.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
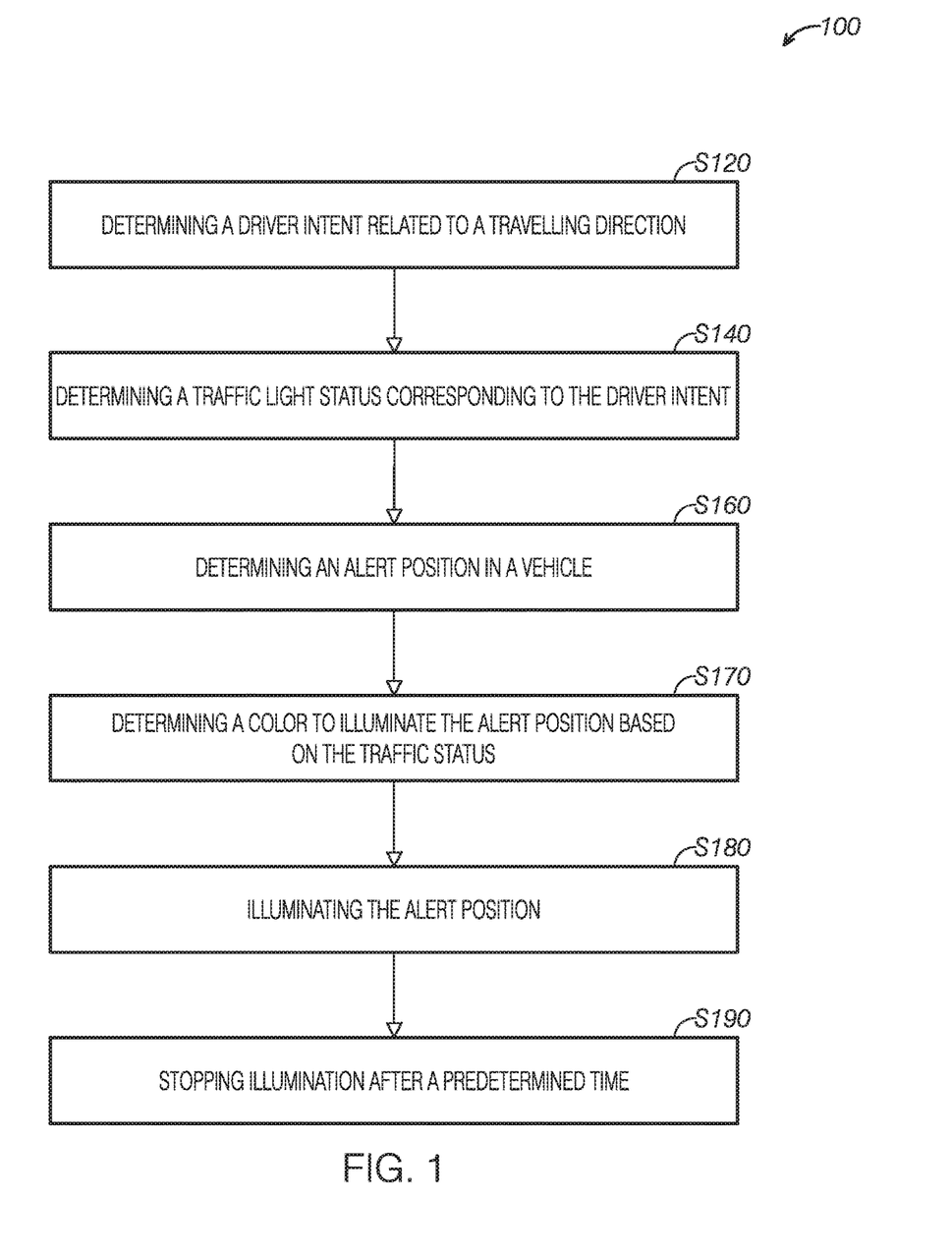
FIG. 1 is a flow chart of a method to alert traffic signals at an intersection according to one embodiment of the present disclosure.

FIG. 1 shows a method 100 to alert traffic lights at an intersection in a vehicle according to one embodiment of the present disclosure. The method 100 includes determining a driver intent related to a vehicle traveling direction at S120; determining traffic light status correspond to the driver intent at S140; determining an alert position in the vehicle based on the driver intent at S160; and illuminating the alert position with at least a first designated color based on the traffic signal status at S180. The alert on the traffic signal at the intersection is achieved via the illumination the alert position by an ambient light system. As described in detail below, the alert position may be located on an area or a region in the vehicle such as an area on an instrumental panel, a center console or a steering wheel. The area may at a left portion and a right portion of the instrumental panel, the center console or the steering wheel, which indicate whether a left turn or a right is allowed. The method 100 may further include stopping illumination at the alert position after a predetermined period time at S190. In this way, the driver's visual fatigue due to continuation of the illumination can be prevented. Compare to a multifunction user interface or other indication systems, the alert by the ambient light is intuitive and more recognizable. Further the method 100 can activate the alert according to the real time driver intent and thus is more user-friendly.

Figure 2:
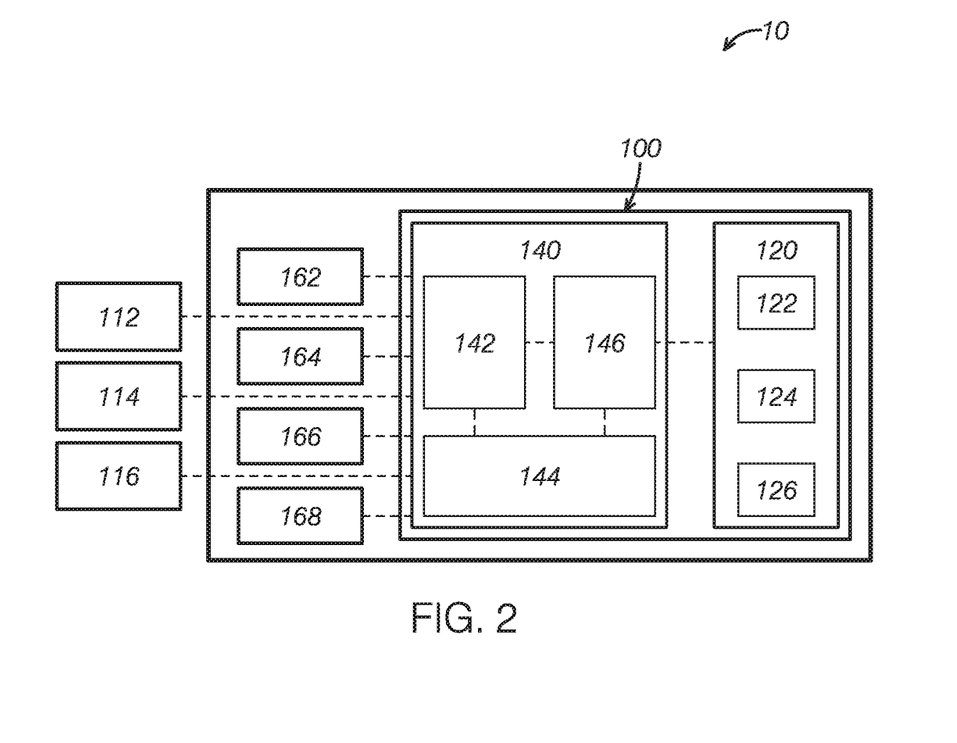
FIG. 2 is a block diagram of an example ambient light system and an environment at which the method in FIG. 1 may be implemented.

FIG. 2 is a block diagram of a vehicle ambient light system and an environment at which the method in FIG. 1 may be implemented. Referring to FIG. 2, a vehicle 10 may include a plurality of systems, such as a multifunction ambient light system 100, a turn signal system 162, a camera system 164, a positioning system 166, and/or a distance detection system 168. The vehicle 10 may further include a plurality of sensors, such as a speed sensor 112, an acceleration meter 114, and a steering wheel sensor 116. The sensors may be sensors commonly used in the art. These systems communicate with each other for implementation of the methods of the present disclosure. FIG. 2 illustrates some of the communication between the system with dash lines. It should be appreciated, although the plurality of systems are shown as a plurality of independent systems, the systems may be integrated in a single control system.

Figure 5A:
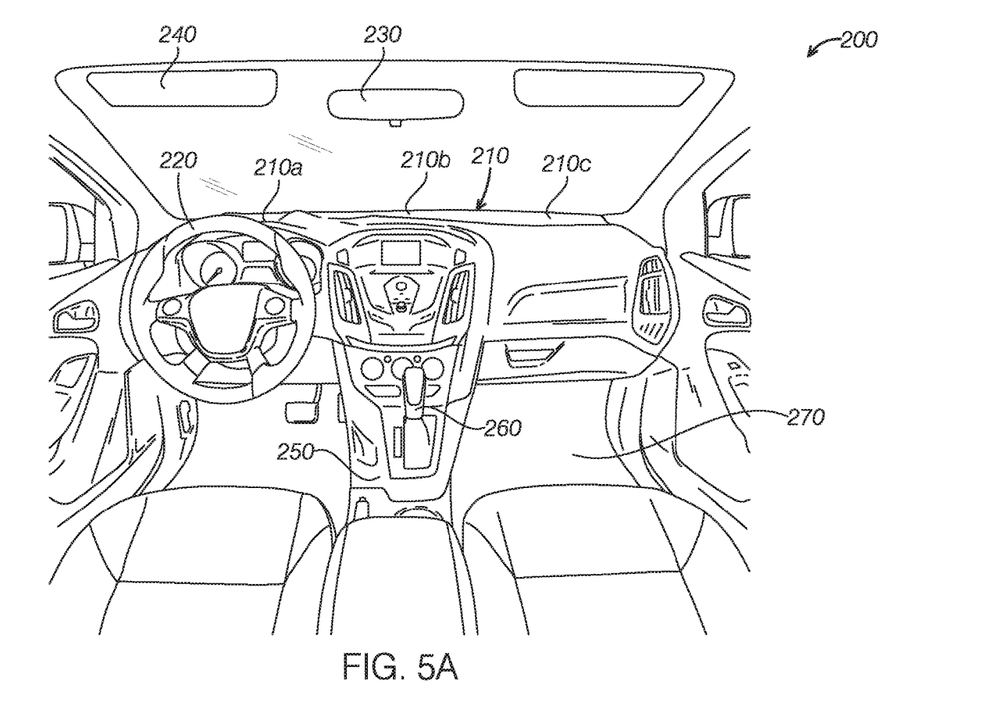
FIG. 5A is a schematic diagram of a vehicle interior at which a method to alert traffic signals may be implemented.
Figure 5B:
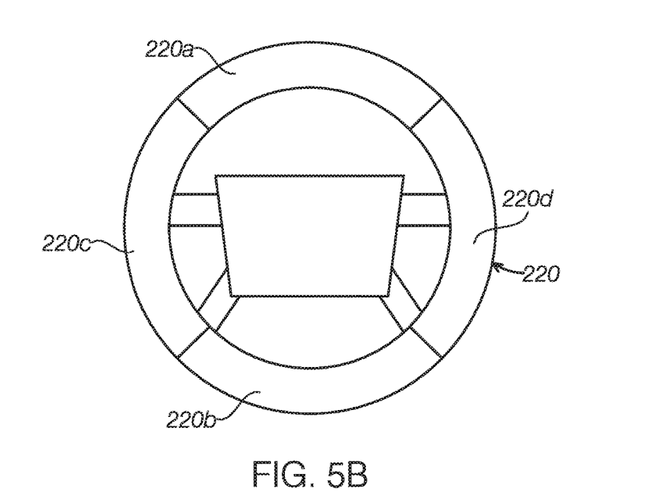
FIG. 5B is a schematic diagram of a steering Wheel at which a method to alert traffic signals may be implemented.

The multifunction ambient light system 100 may include an ambient light 120 and an ambient light controlling device 140. The ambient light 120 may include one or more illumination devices 122, 124, and 126 to illuminate one or more positions in an interior 200 of the vehicle 10. For example, referring to FIG. 5A, the ambient light 120 may illuminate at one or more designated positions on an instrument panel 210, a steering wheel 220, a back-mirror edge 230, a sun visor 240, a center console 250, a gear shift 260, and a foot well 270. Further, the illuminated positions may correspond to different portions of a single part in the vehicle. The illuminated positions may be located at a left portion 210a, a middle portion 210b, and a right portion 210c of the instrument panel 210. Similarly, referring to 5B, the illuminated positions may be located at a front portion (or an upper portion) 220a, a rear portion (or a bottom portion) 220b, a left portion 220c, and a right portion 220d of the steering wheel 220. For illustration purpose, the embodiments of the present invention are described in the vehicle with a driver sitting at the left-hand side of the vehicle. In other embodiments, the invention may be used in a vehicle with the driver sitting at a right-hand side of the vehicle. In some embodiments, the ambient light 120 may be configured to illuminate the specific areas of the vehicle with a plurality of colors such as red, yellow, green, and blue, and the brightness of the light may be adjusted. The ambient light system 120 may include LEDs or other illumination devices, such as incandescent lamps or fluorescent lamps.

Continuing with FIG. 2, the ambient light control system 140 may further include a plurality of modules, such as a driving information module 142, a traffic information module 144, and an ambient light control module 146. Although the modules are shown as independent modules, they may be integrated in one controlling system.

At a driving circumstance, there is a plurality of possibilities on the actions a driver to take at an intersection. For example, the driver may prepare to turn left, right, or go straight. The driving information module 142 may be configured to determine a driver intent related to the vehicle traveling direction at step 120.

Figure 3A:
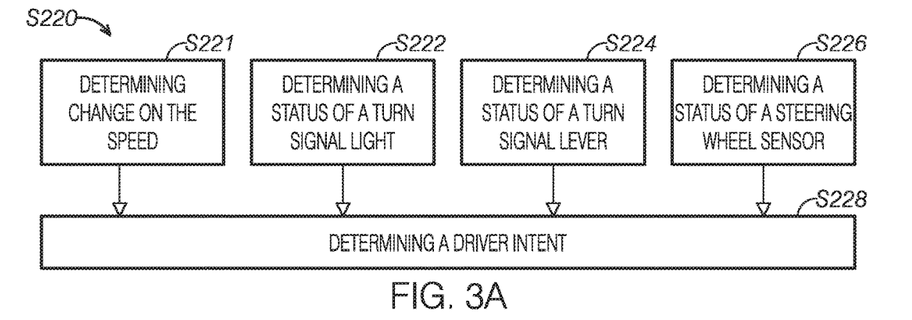
FIG. 3A is a flow chart of an example method to determine g a driver intent.

FIG. 3A shows an example method S220 to determine a driver intent based on the information inside the vehicle according to one or more embodiments of the present disclosure. As described elsewhere in the application, the vehicle 10 or the multifunction ambient light system 100 may include a turn signal system 162 which communicates with the driving information module 142 to assist the determination of the driver intent. When the driver intends to turn left at an intersection, he or she may instruct the turn signal system 162 to turn on the left turn signal by issuing instructions via moving a turn signal lever, pushing a button, or issuing a voice instruction. Similarly, if the driver intends to turn right at the intersection, he or she may instruct the turn signal system 162 to turn on the right turn signal. If the driver intends to go straight, he or she will not issue instructions to the turn signal system 162 and the turn signal lights at the left side and the right side is at an off position. Thus, the method S220 may include determining the on and off status of the left turn light and the right turn light at step S222, Next, the method S220 may include determining the driver intent on the driving direction accordingly at step 228.

In other embodiments, the driver intent may be determined based on other information inside the vehicle. For example, the method S220 may include determining a status of a turn signal lever at S224 and then determining the driver intent on the driving direction at S228. In another example, the method S220 may include determining the current status of a steering wheel sensor at S226, The status of the steering wheel sensor may be used to determine whether the vehicle is turning the left, the right, or going straight or about to turn to the left, right. Next, the method S220 may include determining the driver intent on the driving direction or the travelling direction accordingly at S228.

In another embodiment, the driver intent may be determined by a speed change of the vehicle. At S221, the method S220 may include determining whether the vehicle is accelerating or decelerating, or traveling at a consistent speed according to the speed sensor 112 and/or the acceleration meter 114, and determine the driver intent at step S228 accordingly.

Figure 3B:
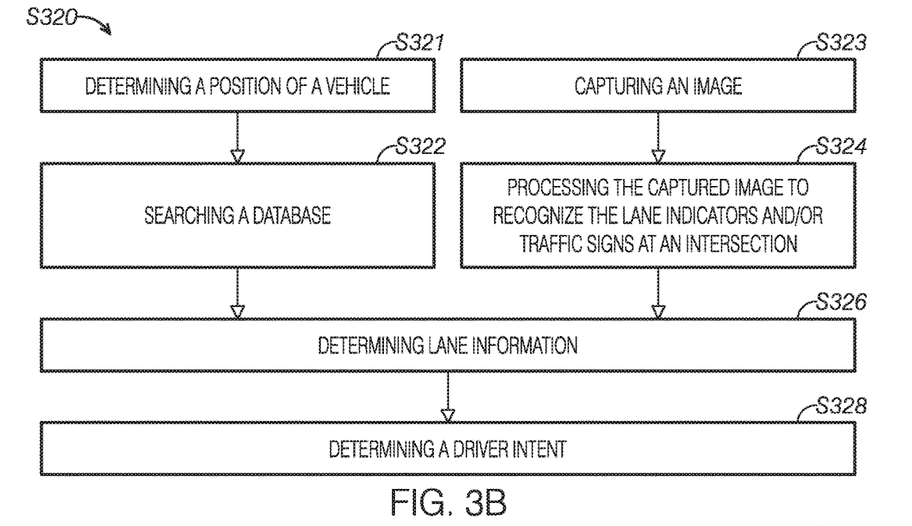
FIG. 3B is a flow chart of another example method to determine a driver intent.

Additionally or alternatively, FIG. 3B shows a method S320 to determine the driver intent based on information outside the vehicle according to one or more embodiments of the present disclosure. In one embodiment, the driver intent on a driving direction or a travelling direction may be determined on a lane at which the vehicle is traveling. There are usually multiple lanes at an intersection, such a lane for left turn, a lane for right turn, a lane for straight travelling and a lane for straight/left turn. The lane information related to the vehicle may assist the driving information module 142 to determine the driver intent on the driving direction. While the vehicle is on the left turn lane, it may be determined that the driver intends to turn left. While the vehicle is on the going-straight lane, the driver intent to go straight may be determined. While the vehicle is on straight/left turn lane, the driver intent to turn left or go straight may be determined.

The method S320 may include determining the lane of the vehicle by various approaches. In one embodiment, as described herein elsewhere in the application, the multifunction ambient light system 100 of the vehicle 10 may include an in-vehicle positioning system 166 (e.g., GPS). The in-vehicle GPS system 166 may communicate with satellites, network stations. At step S321, the method S320 may include determining a position of the vehicle 10 via the in-vehicle GPS system 166 (e.g., altitude and latitude). The multifunction ambient light system 100 may further include a database to determine the current streets, lanes, or points of interest nearby according to the vehicle position. It should be understood that the database may be in a cloud and the GPS system 166 of the vehicle is communicated with the database in the cloud. At step S322, the method S320 may include searching the database to compare the location of the vehicle 10 with information stored in the database. At step 326, the method may include determining the lane information of the vehicle 10 (e.g., left turn lane or right turn lane), and next the method S320 may include determining the driver intent at step S328.

In another embodiment, the method S320 may include determining the driver intent via images captured via the in-vehicle camera system 164. The in-vehicle camera system 164 may include a plurality of devices, such as a camera, a video camera, and/or an image sensor, to collect images near the vehicle. The lanes may include lane indicators, such as direction arrows to provide the lane information. The signs on the lane can be used to determine the lane information. For example, US patent US2014/0032047 A1 discloses a method to determine lane information by evaluating images captured by surrounding sensors which detect directions of the arrows. Similarly, other traffic signs may be shown at an intersection such as a sign to prohibit a right turn or prohibit a left turn. Such traffic indication at the intersection may be used to assist the determination the type of the lane. At step S323, the method S320 may include capturing the images at a front of the vehicle via the in-vehicle camera system 164. Then, at step S324, the method may include processing the captured images to recognize the lane indicators and/or traffic signs at an intersection. Next, the method S320 may include determining the lane information of the vehicle 10 (e.g., a left turn lane or a right turn lane) at step S326. Next, the method S320 may determine the driver intent on the driving direction at step S328.

Figure 6A:
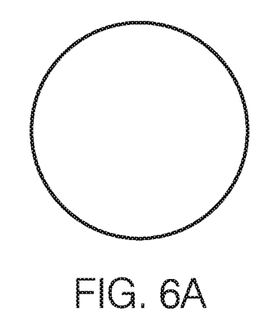
FIG. 6A to 6E are schematic diagrams of traffic lights
Figure 6B:
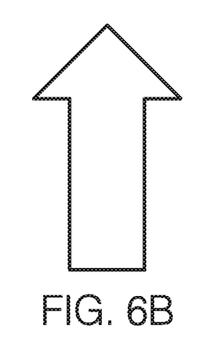
Figure 6C:
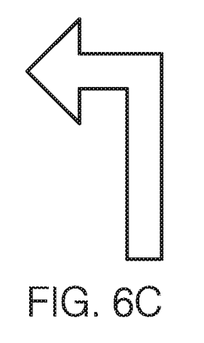
Figure 6D:
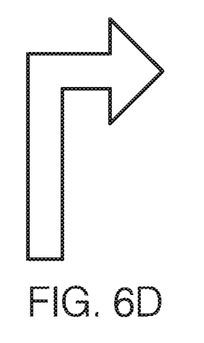
Figure 6E:
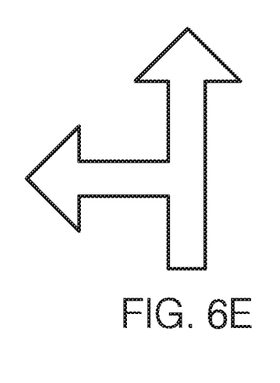

Turning back to FIGS. 1 and FIG. 2, once the driver intent on the driving direction is determined, the method 100 include determining the traffic light status at step S140. Usually, an intersection may have one or more traffic lights to manage the traffic at the intersection. FIG. 6A to 6E illustrates types of traffic light signals. For example, FIG. 6A is a typical a circular traffic light which provides instructions to the driver for a left turn or going straight via different colors. FIG. 6B is a typical traffic light which instructs the driver to go straight by an arrow. FIG. 6C is a typical left turn signal to direct the driver to make a left turn via an arrow pointing the left. FIG. 6D is a typical right turn signal to direct the driver when to make a right turn via an arrow pointing the right. FIG. 6E is a typical signal to direct the driver to go straight or turn left via arrows. It should be understood that FIGS. 6A to 6E are only unlimited examples of traffic light types. There may be other types of traffic lights at the intersections. In addition, the traffic light may have different status to provide information on going or stopping. For example, a red light indicates stopping, a green light indicates passing, or yellow for warning that it is about change to red soon.

Figure 4:
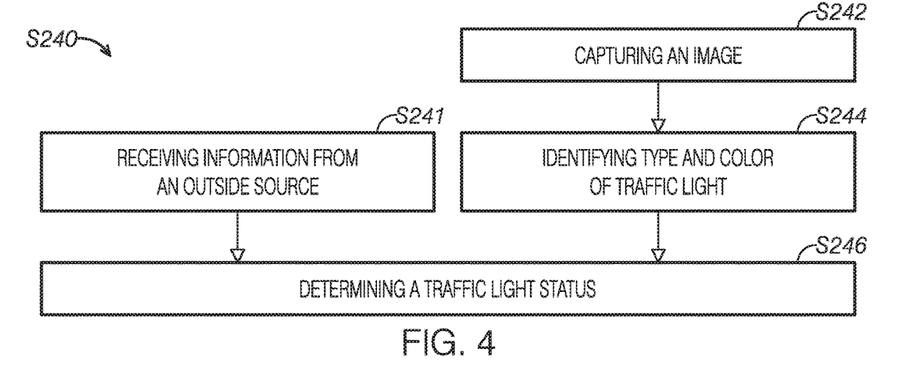
FIG. 4 is a flow chart of an example method to determine traffic light status.

FIG. 4 shows a method S240 to determine the status of the traffic lights. Whether the vehicle 10 can continue travelling at the present time may be determined via the status of the traffic lights corresponding to the driver intent. For example, China Patent ZL 201410250147.6 discloses a method of automatic detecting and identifying the traffic lights based on visual observation, which utilizes camera to capture traffic images and recognize types and colors of the traffic lights. In one or more embodiments of the present invention, the traffic information module 144 may be configured to communicate with the in-vehicle camera system 164 to obtain information related to the traffic light status. The method S240 may include capturing images at a front of the vehicle via, the in-vehicle camera at S242. Next, at step 244, the method S240 may include identifying the type and color of the traffic light by the traffic information module 144 or by the in-vehicle camera system 164 directly. At S246, the method S240 may include determining the traffic light status corresponding to the driver intent on driving direction. For example, when the driver intent to turn left is determined at 120 of the method 100, the method S240 may determine whether the traffic light allows the vehicle to turn left or prohibit to turn left at step S246.

Alternatively, in another embodiment, at step S241, the method S240 may include receiving traffic light information from the outside sources of the vehicle such as a traffic information center, a wireless emitting device at an intersection, and then determining the traffic light status at step 246.

Turning back to FIGS. 1 and 2, as described above, in some embodiments, the method 100 may determine that the driver has various turning possibilities at step 120. When the vehicle 10 is on a straight/left turn lane, it may be judged that the driver may intend to go straight or turn left. Accordingly, at step S140, the method 100 may determine the traffic light status corresponding to the going straight and turning left, such as whether the traffic light permits to go straight but prohibit a left turn.

Continuing with FIGS. 1 and 2, upon determination of the traffic light status, the method 100 may proceed to step S160 to determine an alert position in the vehicle. The ambient light control module 146 may be configured to determine the illumination position of the ambient light to light different alert positions based on the driver intent determined at step 120.

In one embodiment, if the driver intent for a left turn is determined at the step S120, the alert position may be determined to be a left side 210a of the instrumental panel, and the ambient light 120 may illuminate at least portion of the left side 210a of the instrumental panel at the later steps. In other embodiments, the alert position may be other left portion of the vehicle, such as a left foot well, a left side of a sun visor, or a left side of interior trim panel. The alert position may also be located at other portions of the vehicle, such as a left portion of the steering wheel 220c.

Similarly, in another embodiment, if the driver intent for a right turn is determined at step 120, the alert position may be determined to be a right side 210c of the instrument panel and at least portion of the right side 210c is illuminated by the ambient light 120 in a later step. In other embodiments, the alert position may be other right portions of the vehicle, such as a right foot well, a right side of a sun visor, a right side of an interior panel. The alert position may also be located at other portion of the vehicle, such as a right portion of the steering wheel 220d.

In another embodiment, if the driver intent for going straight is determined at step S120, the alert position may be determined to be at an entire instrument panel 210 and/or an entire center console 250, and the ambient light 120 may illuminate this area at the later steps. In other embodiments, the alert position may be other areas of the vehicle, such as a middle area 210b of the instrumental panel 210, a middle portion of the steering wheel 220, or entire vehicle interior.

As described above, in some embodiments, step S120 may indicate that the driver has more than one possibility of driving directions, such as intents to go straight or turn left. At least two alert positions may be determined corresponding to the driver intents on the driving direction. For example, the alert position may be determined to be at as a left area 210a of the instrument panel and the center console 250 and the ambient light may be controlled to illuminate at an appropriate position based on the traffic light status of the going straight or turning left.

The present application describes the alert positions with reference to a plurality of areas in the vehicle. It should be understood that the entire area may be illumined or not be illuminated in practical application. For example, only an edge of the area or certain portion of the area may be illumined.

Continuing with FIGS. 1 and 2, after the alert position is determined at step S160, the method 100 proceeds to step S170 to further determine at least a first designated color to illuminate the alert position. The ambient light control module 146 may be configured to determine the color based on the traffic light status determined at step S140. For example, the corresponding color is determined to be red when the traffic light status is to stop going or the traffic light is red. The corresponding color is determined to be yellow when the traffic light status is warning or yellow light. The corresponding color is green when the traffic light status is pass or green light. Other light colors may also be used to correspond to the traffic light status.

As described above, in some embodiments, the step 120 may indicate that the driver has more than one intent on the driving direction, and step S140 determines the traffic light statuses corresponding to all possible turning intents. Next, the step S160 determines the alert positions corresponding to all possible turning intents. Next, at step S170, the method 100 may include determining one or more first designated colors corresponding to all possible traffic light statuses. For example, if the driver intends to turn left or go straight, and the traffic light status indicates permission to go straight but prohibit to turn left, then the first designated color may be determined to be green and red, and then the method 100 includes illumining the center console with a green color and illumine the left side of the instrumental panel area with a red color at step S180.

Continuing with FIGS. 1 and 2, after the color is determined at step S170, the method 100 proceeds to step S180 to illumine the determined alert position with the first designated color. The ambient light control module 146 may be configured to control the ambient light 120 to illumine at least one alert position with at least one designated color.

Additionally or alternatively, the method 100 may include stopping illumination at the alert position after a predetermined period time. For example, the ambient light control module 146 may turn off the ambient light 120 after 3, 5, 7, or 10 seconds to prevent the driver visual fatigue due to continuation of the illumination.

In addition, in one or more embodiments, the traffic light status may be continually monitored and the alert position may be illuminated with a second designated color in response a change of the traffic light from a first status to a second status. For example, when the traffic light for going straight is changed from red to green, the ambient light control device 146 controls the ambient light 120 to issue green light to illuminate the center console 250 in one example. Similarly, illumination with the second designated color light may end at the predetermined time to prevent a visual fatigue for the driver.

In addition, the ambient light control device 140 may control the ambient light 120 to implement further function to alert the driver. In one embodiment, the drive information module 142 may be configured to determine a current vehicle speed or a speed change via a vehicle speed sensor or via communication with an in-vehicle positioning system 166. For example, the driving information module 142 may be configured to determine whether the vehicle is accelerating, decelerating, or travelling at a consistent speed. The traffic information module 144 may be configured to determine a speed limit of the current road via communication with the in-vehicle camera system 164 or the GPS 166. Thus, the ambient light control module 146 may compare the vehicle speed and/or vehicle speed change with the speed limit and control the ambient light 120 to illumine a colored light to indicate if the vehicle exceeds the speed limit. For example, when the vehicle accelerates and approaches or exceeds the speed limit, the ambient light 120 may be controlled to illumine red light at one or more alert positions, such as an entire vehicle interior. When the vehicle decelerates or travels below the speed limit, the ambient light 120 is controlled to illumine a green light. When the vehicle travels below the speed limit at a certain value, the ambient light 120 may be controlled to illumine a yellow light to alert the driver.

In another embodiment, the driving information system 142 may be configured to determine a current speed of vehicle 10 via communicating with a vehicle speed sensor or an in-vehicle GPS 166. The traffic information module 144 may be configured to determine a distance of the vehicle to a left vehicle, a right vehicle, a front vehicle, and a rear vehicle via a distance detection device. Thus, the ambient light control module 146 may determine if the vehicle 10 is in a safe distance to the surrounding vehicles based on the current vehicle speed, and control the ambient light 120 to illumine lights with different colors at corresponding position to alert the driver. The distance detecting device 168 may include a radar, an object detecting device, or other conventionally used devices. For example, at speed of 100-kilometer per hour, the vehicle's safe distance may be determined to be 100 meters. When the distance of the vehicle 10 to the front vehicle is less than 100 meters, the ambient light control module 146 may control the ambient light 120 to illumine a red light at the upper portion 220*a* of the steering wheel 220. When the distance of the vehicle 10 to the front vehicle is between 100 and 150 meters, the ambient light control module 146 may control the ambient light 120 to illumine a yellow light at the upper portion 220*a* of the steering wheel 220. When the distance of the vehicle 10 from the front vehicle is greater than 150 meters, the ambient light control module 146 may control the ambient light 120 to illumine a green light at the upper portion 220*a* of the steering wheel 220. In another embodiment, when the distance of the vehicle 10 to the front vehicle is less or equal 100 meters, the ambient light 120 illumines red light at the front portion 220*a* of the steering wheel; and when the distance of the vehicle 10 to the front vehicle is greater than 100 meters, the ambient light 120 illumines green light at the front portion 220*a* of the steering wheel, or do not illumine a light.

Similarly, a bottom portion 220*b* of the steering wheel 220 may be configured to be an alert position for a distance between the vehicle 10 and a rear vehicle. The left portion 220*c* of the steering wheel 220 may be configured to be an alert position for a distance between the vehicle 10 and a left vehicle. The right portion 220*d* of the steering wheel 220 may be configured to be an alert position for a distance between the vehicle 10 and a right vehicle.

Figure 7:
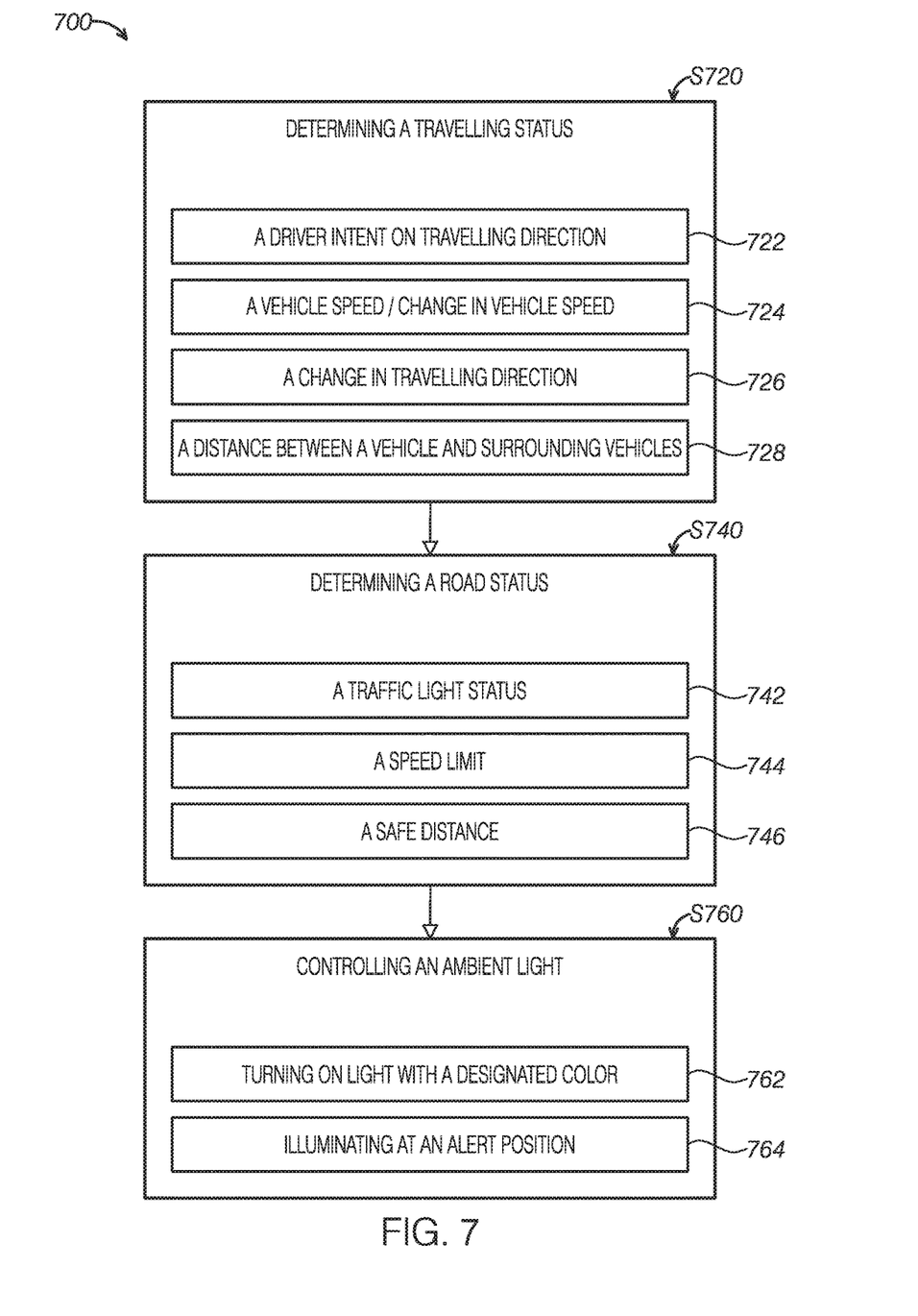
FIG. 7 is a method to operate an ambient light system according to one embodiment of the present disclosure.

Referring to FIG. 7, FIG. 7 shows a high-level method 700 to control a vehicle multifunction ambient light system according to one embodiment of the present disclosure. At step S720, the method 700 may include determining a traveling status of vehicle 10. The traveling status may include the driver intent on a travelling direction 722, a vehicle speed or a vehicle speed change 724, a change in traveling direction 726, and/or a distance 728 between the vehicle 10 and surrounding vehicles. The travelling status may be determined by any appropriate approaches such as methods or systems described herein elsewhere in the application. At step S740, the method 700 may include determining a road status corresponding the traveling status of the vehicle 10. The road status may include a traffic light status 742, a speed limit 744, and/or a safe distance 746 between the vehicle 10 and the surrounding vehicles. The road status may be determined by any appropriate approaches such as methods or systems described herein elsewhere in the application.

At step S760, the method 700 may include controlling the multifunction ambient light 120. The control of the multifunction ambient light 120 may include turning on a designated color 762 and illuminating an alert position 764 to provide information to the driver based on the vehicle traveling status and road status. For example, the illumination at the alert position may indicate whether the vehicle can make a turn as the driver intends, the vehicle travels within a speed limit, the vehicle 10 travels in a safety distance the surrounding vehicles. In some embodiments, when the vehicle is accelerating and driving at a speed approaching a speed limit, the method 700 may control the ambient light to illumination to alert the driver about the speed limit to avoid speeding. When the vehicle is traveling at a speed greater than a speed limit, the method 700 may control the ambient light to illumination to alert the exceedance of the speed limit. In some embodiments, when the vehicle is traveling over a speed limit, the method 700 may control the ambient light to flash to further attract the driver's attention. In some embodiments, the alert position and illumination of the light are based on a change on the vehicle traveling direction and a safety distance between the vehicle and the surrounding vehicles. For example, when it is determined that the vehicle is moving toward the left and is about to approach a safety distance, the method 700 may control the ambient light to illumine to alert the driver to keep a safe distance with the left vehicle at the step S760.

When it is determined that the vehicle is moving toward the right and is about to approach a safe distance, the method 700 may control the ambient light to illumine to alert the driver to keep a safe distance from the right vehicle. When it is determined that the vehicle exceeds a safe distance with the surrounding vehicles, the current distance is less than the safe distance), the method 700 may control the ambient light to illuminate to remind the driver to maintain a safe distance from surrounding vehicles and illuminate light with a manner that attracts more attention from the driver such as flashing.

The present disclosure provides a method to alert a traffic light at an intersection and a multi-function ambient light system. The ambient light system illuminates colored lights based on a driver intent, a vehicle travelling status and a road condition. In this way, a necessary alert can be provided in a timely fashion without an input from the driver. Further, the alert is easily to be identified and draw the driver's attention.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A method to alert traffic light at an intersection in a vehicle, comprising:
    determining a driver intent to make a left turn, make a right turn or go straight;
    determining a traffic light status corresponding to the driver intent, wherein the the traffic light status is determined by an in-vehicle camera system;
    determining an alert position based on the driver intent, wherein the alert position is at a left portion, a right portion, or a middle portion or an entire portion of a vehicle part and corresponds to the driver intent to make the left turn, make the right turn or go straight, respectively; and
    illuminating the alert position with at least a first designated color based on the traffic light status,
    wherein the driver intent is determined based on a status of one of a turn signal light, a turn signal switch, a steering wheel sensor, or a lane of the vehicle at which the vehicle is traveling.

2. The method of claim 1, wherein the lane of the vehicle is determined by an in-vehicle positioning device.

3. The method of claim 1, wherein the lane of the vehicle is determined via a lane sign identified on an image taken by an in-vehicle camera system.

4. The method of claim 1, further comprising:
    determining that the alert position is at a left area of an instrument panel in response to the driver intent indicating the left turn;
    determining that the alert position is at a right area of the instrument panel in response to the driver intent indicating the right turn; and
    determining that the alert position is at an entire instrument panel area or a center console area in response to the driver intent indicating going straight.

5. The method of claim 1, wherein determining that the alert position includes determining a first alert position at a left area of an instrument panel with the first designated color based on the traffic light status and a second alert position at a center console with a second designated color based on the traffic light status in response to the driver intent indicating making the left turn and going straight, respectively.

6. The method of claim 1, further comprising illuminating on the alert position for a predetermined time.

7. The method of claim 1, further comprising: illuminating the alert position with at least a second designated color in response to a change of the traffic light from a first status to a second status.

8. A multifunction ambient light system in a vehicle; comprising:
    an ambient light to illuminate a plurality of color lights at a plurality of positions;
    a control device for the ambient light including:
    a driving information module configured to determine a driver intent related to a vehicle travelling direction,
    a traffic information module configured to communicate with an in-vehicle camera system and determine a traffic light status corresponding to the driver intent; and
    an ambient light control module configured to determine a preset position of illumination by the ambient light and control the ambient light to illuminate a designated color based on the traffic status and the driver intent,
    wherein the preset position is at a left portion, a right portion, or a middle portion or an entire portion of a vehicle part and corresponds to the driver intent to make a left turn, make a right turn or go straight, respectively,
    wherein the driving information module is communicated with a turn signal system to determine the driver intent.

9. The multifunction ambient light system of claim 8, wherein the driving information module is communicated with the in-vehicle camera system to determine a lane of the vehicle.

10. The multifunction ambient light system of claim 8, wherein the driving information module is further configured to determine a vehicle driving speed, the traffic light module is further configured to communicate with an in-vehicle positioning system to determine a speed limit, and the ambient light control module is configured to control the ambient light to illuminate lights of different colors to indicate whether the vehicle speed is greater than, less than or equal to the speed limit.

11. The multi-unction ambient light system of claim 8, wherein the driving information module is further configured to determine a vehicle driving speed, the traffic information module is further configured to communicate with a distance detecting system to determine a distance with a front vehicle, a rear vehicle, a left vehicle and a right vehicle and the ambient light control module is configured to illuminate at a front, a bottom, a left or a right portion of a steering wheel to indicate whether the distance of the vehicle with the front, the rear, the left and the right vehicles is in a safe range.

* * * * *